US009261103B1

(12) United States Patent
Moscetti

(10) Patent No.: US 9,261,103 B1
(45) Date of Patent: Feb. 16, 2016

(54) INTEGRATION OF AERODYNAMIC, THRUST BEARING AND SEAL RUNNING SURFACE

(71) Applicant: BorgWarner Inc., Auburn Hills, MI (US)

(72) Inventor: Jason Moscetti, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/714,397

(22) Filed: May 18, 2015

(51) Int. Cl.
*F04D 29/051* (2006.01)
*F16C 17/04* (2006.01)
*F16C 27/02* (2006.01)
*F04D 25/04* (2006.01)

(52) U.S. Cl.
CPC ............ *F04D 29/051* (2013.01); *F04D 25/045* (2013.01); *F16C 17/047* (2013.01); *F16C 27/02* (2013.01)

(58) Field of Classification Search
CPC .............. F04D 29/051; F04D 29/0437; F04D 29/0513; F04D 25/045
See application file for complete search history.

(56) References Cited

U.S. PATENT DOCUMENTS

| | | | | |
|---|---|---|---|---|
| 3,066,990 A * | 12/1962 | Frohlich | | 384/368 |
| 3,077,296 A * | 2/1963 | Ping, Jr. | | 415/180 |
| 4,240,678 A * | 12/1980 | Sarle et al. | | 384/369 |
| 4,479,728 A * | 10/1984 | Miller | | 384/369 |
| 5,178,471 A * | 1/1993 | Roessler et al. | | 384/369 |
| 5,827,040 A * | 10/1998 | Bosley et al. | | 415/106 |
| 5,857,332 A * | 1/1999 | Johnston et al. | | 60/607 |
| 5,961,217 A | 10/1999 | Heshmat | | |
| 6,158,892 A | 12/2000 | Stewart et al. | | |
| 6,702,463 B1 | 3/2004 | Brockett et al. | | |
| 7,108,488 B2 | 9/2006 | Larue et al. | | |
| 7,401,980 B2 * | 7/2008 | Krauss et al. | | 384/420 |
| 7,997,802 B2 * | 8/2011 | Simon et al. | | 384/130 |
| 8,240,921 B2 * | 8/2012 | Boning et al. | | 384/420 |
| 8,328,506 B2 * | 12/2012 | Furman et al. | | 415/173.3 |

* cited by examiner

*Primary Examiner* — Edward Look
*Assistant Examiner* — Christopher J Hargitt
(74) *Attorney, Agent, or Firm* — BrooksGroup

(57) ABSTRACT

A number of variations may include a product for use with a turbocharger system may include a housing with a rotor wheel rotatable relative to the housing. The rotor wheel may have a front face with blades disposed in a gas stream and a back wall facing the housing. The rotor wheel may generate thrust loads. A thrust bearing may be positioned on the housing and may face the back wall. The thrust bearing may be configured to directly absorb the thrust loads from the rotor wheel.

30 Claims, 4 Drawing Sheets

INTEGRATION OF AERODYNAMIC, THRUST BEARING AND SEAL RUNNING SURFACE

TECHNICAL FIELD

The field to which the disclosure generally relates includes turbocharger systems for use with internal combustion engines and in particular, includes turbocharger design and construction to address aero clearances.

BACKGROUND

A turbocharger for use with an internal combustion engine may typically include a compressor that may be driven by a turbine or other rotation imparting device. The turbine may have a wheel connected to a compressor wheel by a common shaft that is supported for rotation by bearings. The bearings may be disposed in a housing that is situated between the turbine and the compressor. The shaft, the turbine wheel and the compressor wheel may rotate at speeds that approach hundreds of thousands of revolutions per minute. In addition, the turbine may be exposed to high temperature exhaust gases and the resulting heat may be transferred to other system components. Under these harsh, and increasingly demanding operating conditions, the lifespan of a turbocharger is expected to match that of the engine with which it operates. To accomplish that challenge, the design of a turbocharger and its components must survive as expected, while still being cost effective and competitive.

SUMMARY OF ILLUSTRATIVE VARIATIONS

According to a number of variations, a product for use with a turbocharger system may include a housing with a rotor wheel rotatable relative to the housing. The rotor wheel may have a front face with blades disposed in a gas stream and a back wall facing the housing. The rotor wheel may generate thrust loads. A thrust bearing may be positioned on the housing and may face the back wall. The thrust bearing may be configured to directly absorb the thrust loads from the rotor wheel.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
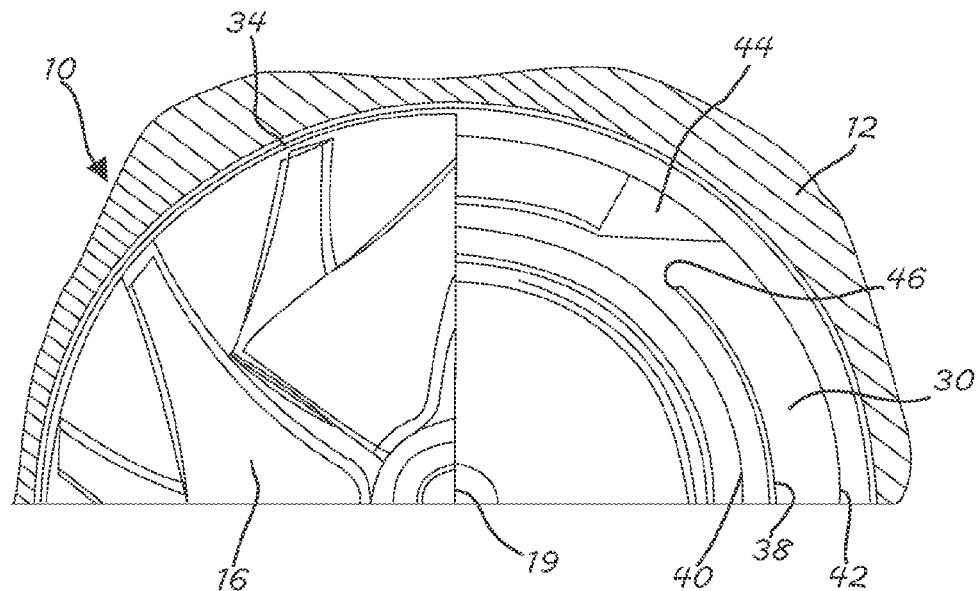
FIG. 1 is a fragmented end view of part of a turbocharger assembly around a wheel area according to a number of variations, with the rotor wheel cover removed.
Figure 3:
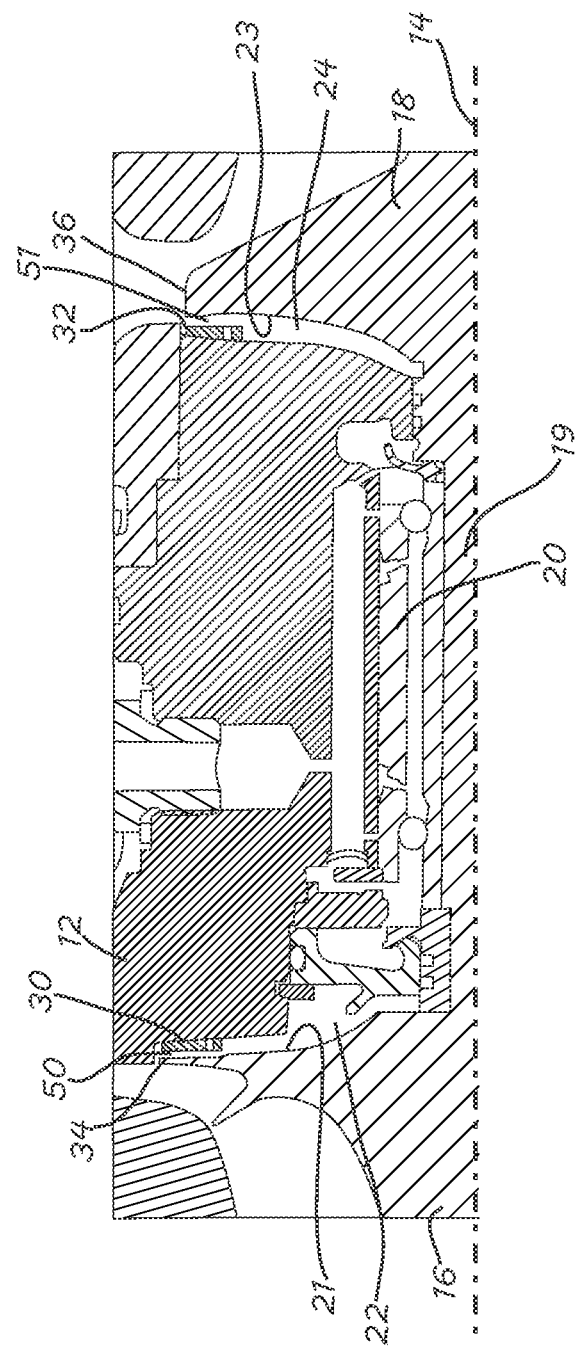
FIG. 3 is a fragmented sectioned illustration of a rotor and housing assembly of a turbocharger according to a number of variations.

In a number of variations as illustrated in FIG. 1, a turbocharger assembly 10 may include a housing 12 that may be a center or bearing housing. As such, the housing 12 may be disposed between a compressor wheel 16 and a turbine wheel 18 as shown with additional reference to FIG. 3. The turbine wheel 18 may be connected to the compressor wheel 16 by a common shaft 19. The compressor wheel 16, the turbine wheel 18 and the shaft 19 may form a rotor assembly. The shaft 19 may extend through the housing 12 in a direction that may be designated as an axial direction. The radial direction may be toward or away from the axis 14 and generally perpendicular relative thereto. The housing 12 may include bearings 20 that may support the shaft 19 for rotation in the housing 12 and which may require lubrication. A seal mechanism may be employed to seal the ends 22 and 24 of the housing 12 to prevent lubricant from entering the areas of the compressor wheel 16 and the turbine wheel 18.

Operation of the rotor assembly including the compressor wheel 16, the shaft 19, and the turbine wheel 18, may result in axial loads that may be absorbed to limit axial movement. For example, a wheel may generate thrust loads as a result of non-uniform pressure distribution on the surfaces exposed to air. Axial movement may be limited to maintain efficient operation and to avoid damage of the compressor wheel 16 and the turbine wheel 18. This may entail maintaining tight clearances 50, 51 between the compressor wheel's back wall 21 and the housing 12, as well as between the turbine wheel's back wall 23 and the housing 12, respectively. Limiting axial movement entails providing a radially extending surface against which forces from the rotor assembly may react. If not otherwise limited, these forces may be applied to the bearing system. To avoid having the forces absorbed solely by the bearing system, the housing 12 may include an integral or connected thrust bearing 30 against which the compressor wheel 16 may react and may include an integral or connected thrust bearing 32 against which the turbine wheel 18 may react. The thrust bearings 30, 32 may be of an annular disc shape and may be located near the outer circumferences at the peripheral tips 34, 36 of the wheels 16, 18 respectively.

As shown in FIG. 1, the thrust bearing 30 may be positioned on the housing 12 in a circle that may be within the outer circumference or peripheral tip 34 of the compressor wheel 16. The thrust bearing 30 may extend completely around the center (the axis), of the shaft 19, while one quadrant is shown in FIG. 1 as exposed by sectioning one quadrant of the compressor wheel 16. A slot 38 may be formed nearly entirely around an interior diameter of the thrust bearing 30. The slot 38 may extend completely through the thickness of the thrust bearing 30, or may be formed to another desired depth. The radial location of the slot 38 may be closer to the inner periphery 40 of the thrust bearing 30 than to the outer periphery 42. The slot may allow the working hydrodynamic sections of the thrust bearing 30 to deflect relative to the housing 12.

The slot 38 may have a vent 44 that opens from the slot body through the radially outward directed surface of the outer periphery 42. At its opposite end, the body of the slot 38 may have a blind end 46. The slot 38 may manage the results of both heat transfer through the thrust bearing and flow dynamics around the surfaces and allow axial and/or tilting deflection with respect to the housing. Thermal displacement, or expansion and contraction, may result from temperature changes. In addition, the slot 38, and the thrust bearing 30 in general, may generate radial pressure gradients inward and outward. This may provide a barrier to reduce leakage into the working air. For example, the inward pressure gradient may be useful in preventing oil from escaping the bearing housing by maintaining an outboard to inboard directed pressure gradient across sealing surfaces 48 (shown in FIG. 2), between the rotor assembly and the non-rotating parts.

Figure 2:
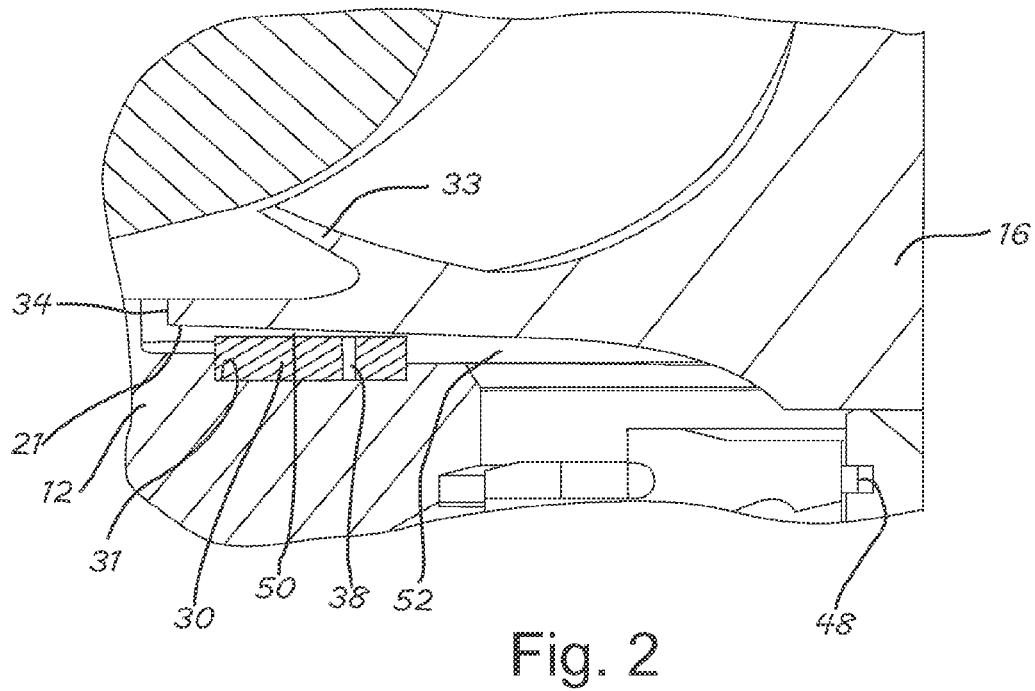
FIG. 2 is a partial longitudinal sectional view of a turbocharger assembly around a rotor wheel area according to a number of variations.

As illustrated in FIG. 2, the thrust bearing 30 may be fixed in an annular groove 31 in the housing 12 that is near the peripheral tip 34 of the compressor wheel 16 at the peripheral tip 34. Alternately, the thrust bearing 30 may be formed as part of the housing 12. The thrust bearing 30 may protrude from the housing 12 toward the back wall 21 forming a small clearance space 50 between the compressor wheel 16 and the thrust bearing 30. The compressor wheel 16 may include a face with blades 33 that may interact with a flow of gas and that may impart both temperature gradients and forces to the compressor wheel 16. The compressor wheel 16 may contact the surface of the thrust bearing 30 at low speed and high load conditions. At normal and high load conditions at high speed, the thrust bearing 30 and compressor wheel 16 may be hydrodynamic in nature so that they do not contact. The contacting surfaces may be treated or coated for durability to address any lack of hydrodynamic action. The bearing surface may also be compliant to allow deflection and minimize contact as further described below. The thrust bearing 30 may reduce static load by preventing static pressure build up in the back-wall cavity 52 by restricting flow into the back wall cavity 52. The thrust bearing 30 may also increase dynamic pressure during low pressure operation of the turbocharger to assist in keeping oil in the housing and away from the compressor wheel area. In addition, the axial length of the rotor assembly may be shortened by eliminating unneeded sections that might otherwise be dedicated for seals or thrust bearings.

Figure 4:
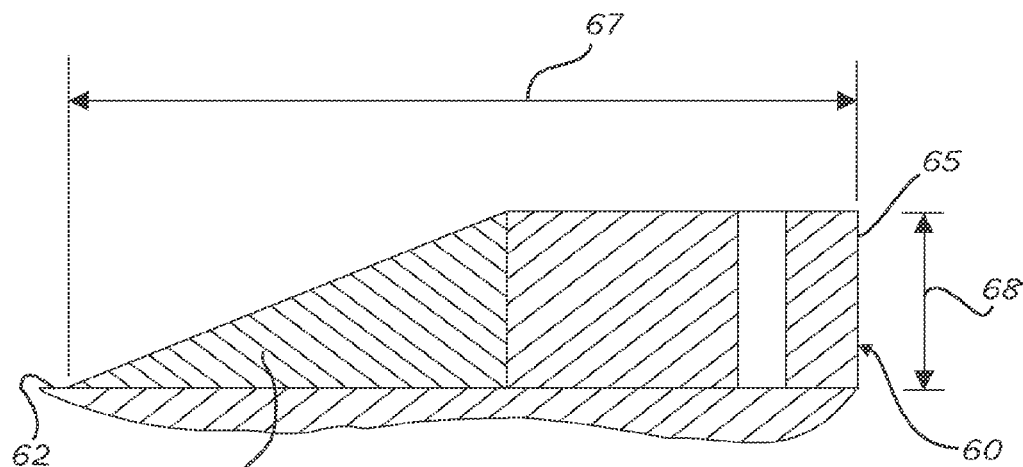
FIG. 4 is a schematic illustration of a thrust bearing according to a number of variations.
Figure 5:
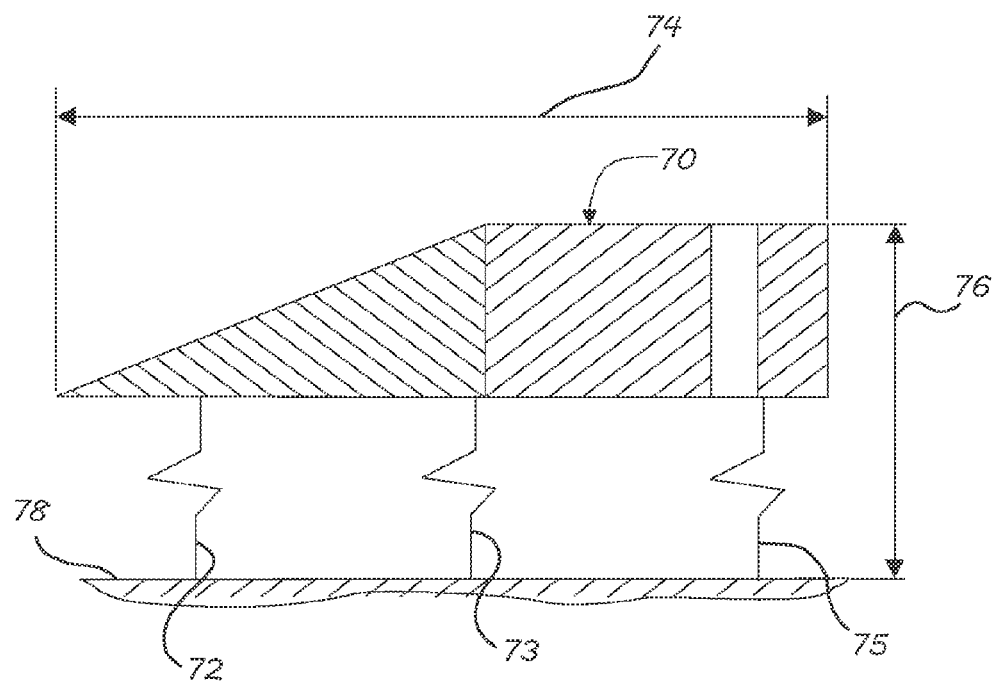
FIG. 5 is a schematic illustration of a thrust bearing according to a number of variations.

According to a number of variations a thrust bearing may include a tapered land and may include an arrangement of flexible supports to allow axial or angular compliance. For example, as illustrated in FIG. 4, a thrust bearing 60 may be positioned on a housing 62 and may include a ramp section 64 and a land section 65. The thrust bearing 60 may include a length 67 and a height 68. Pressure adjacent the thrust bearing 60 may increase along the length of the ramp section 64 as its height increases. The pressure distribution along the length of the thrust bearing 60 may be tuned by varying the slope of the ramp section 64 and the height 68 of the land section 65. With reference to FIG. 5, pressure distribution may be further tuned by providing compliance to the thrust bearing 70. The thrust bearing 70 may include a flexible or compliant element or elements 72, 73, 75 that may allow the working hydrodynamic sections of the thrust bearing 70 to deflect toward the housing 78. Pressure along the length 74 may effectively reduce the local height 76 by deflection of the thrust bearing 70, or a section thereof, toward the housing 78 changing the radial slope of the thrust bearing 70. The radial slope is the slope of the profile of the thrust bearing 70 in the radial direction on its side opposite the side against the housing 78. The thrust bearing 70 may be further tuned by varying the compliance of the flexible elements 72, 73 and 75 along the length 74.

Figure 6:
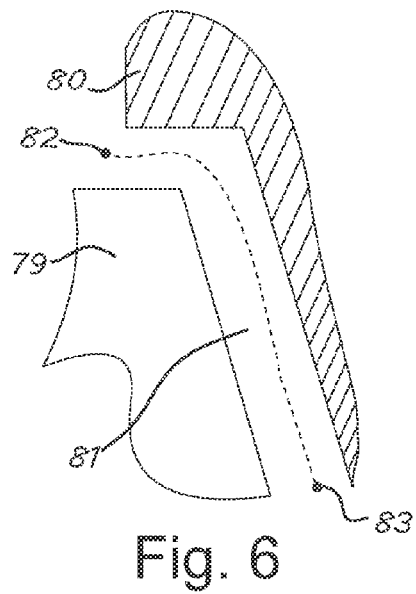
FIG. 6 is a fragmentary schematic illustration of a turbocharger's back wall cavity area according to a number of variations.
Figure 7:
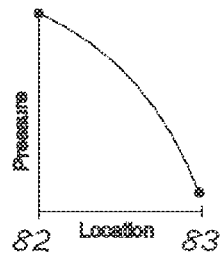
FIG. 7 is a graph of pressure versus location through the back wall cavity area of FIG. 6 according to a number of variations.
Figure 8:
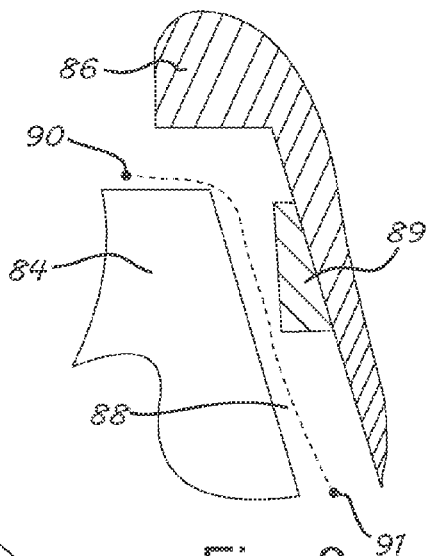
FIG. 8 is a fragmentary schematic illustration of a turbocharger's back wall cavity area according to a number of variations.
Figure 10:
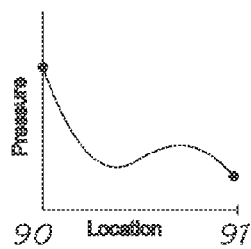
FIG. 10 is a graph of pressure versus location through the back wall cavity area according to a number of variations.
Figure 9:
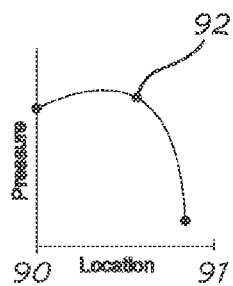
FIG. 9 is a graph of pressure versus location through the back wall cavity area according to a number of variations.
Figure 11:
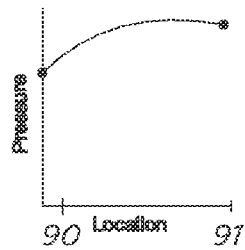
FIG. 11 is a graph of pressure versus location through the back wall cavity area according to a number of variations.

Illustrated in FIG. 6, a compressor wheel 79 may be positioned near a housing 80 so as to define a back wall cavity 81 that may not include a thrust bearing. During operation of the compressor wheel 79, pressure distribution radially inward from point 82 to point 83 may generally decrease as location moves radially inward as illustrated in FIG. 7. With reference to FIG. 8, a compressor wheel 84 may be positioned near a housing 86 so as to define a back wall cavity 88 that may include a thrust bearing 89. During operation of the compressor wheel 84, pressure distribution may vary radially inward from point 90 to point 91. In a number of variations as depicted by FIG. 9, pressure may generally increase from the point 90 as locations move radially inward to a peak pressure at point 92 and may then decrease as location moves radially inward toward the point 91. Such performance may be provided by a thrust bearing with ramp section such as the thrust bearing 60 of FIG. 4 or thrust bearing 70 of FIG. 5. In a number of variations as depicted by FIGS. 10 and 11, pressure may initially decrease moving inward from point 90, and may temporarily increase before decreasing again toward point 91, or pressure may continuously increase moving radially inward from point 90 toward point 91, or pressure may be otherwise varied. Such performance may be provided by varying the dimensions of the thrust bearings 60 or 70 or by varying the compliance of one or more of the flexible elements 72, 73 and 75. By providing less height or greater compliance at a select point along the radial length of the thrust bearing, the pressure at that point may be decreased. By providing more height or less compliance at a select point along the radial length of the thrust bearing, the pressure at that point may be increased.

The description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product for use with a turbocharger system and may include a housing with a rotor wheel rotatable relative to the housing. The rotor wheel may have a front face with blades disposed in a gas stream and a back wall facing the housing. The rotor wheel may generate thrust loads. A thrust bearing may be positioned on the housing and may face the back wall. The thrust bearing may be configured to directly absorb the thrust loads from the rotor wheel.

Variation 2 may include a product according to variation 1 wherein the thrust bearing may be annular in shape.

Variation 3 may include a product according to variation 1 or 2 wherein a slot may be formed in the thrust bearing. The slot may extend around a majority of the thrust bearing.

Variation 4 may include a product according to variation 3 wherein the thrust bearing may have an inner periphery and an outer periphery and wherein the slot may be nearer the inner periphery than the outer periphery.

Variation 5 may include a product according to any of variations 1 through 4 wherein the thrust bearing may extend toward the back wall. A back wall cavity may be defined between the rotor wheel and the housing. The housing may have a section containing lubricant. The thrust bearing may direct a pressure in the back wall cavity to maintain the lubricant in the housing.

Variation 6 may include a product according to variation 5 wherein the thrust bearing may be positioned on the housing by a compliant element that may allow at least part of the thrust bearing to move relative to the housing.

Variation 7 may include a product according to variation 3 or 4 wherein the slot may have an opening through the outer periphery of the thrust bearing.

Variation 8 may include a product according to any of variations 1 through 7 wherein the thrust bearing may include a ramp section.

Variation 9 may include a product according to any of variations 1 through 8 and may include a back wall cavity defined between the rotor wheel and the thrust bearing. The thrust bearing may provide a tunable dynamic pressure caused by the rotor wheel in the back wall cavity.

Variation 10 may include a method of thrust load absorption in a turbocharger assembly that has a rotor wheel with a back wall and a housing. The rotor wheel may have an outer diameter and an inner diameter. A thrust bearing may be provided on the housing so that the thrust bearing faces the back wall. Gas pressure between the back wall and the housing may be affected by the thrust bearing. The gas pressure acting on the back wall toward the outer diameter may be reduced and the gas pressure acting on the back wall toward the inner diameter may be increased by changing a radial slope of the thrust bearing from the outer diameter to the inner diameter.

Variation 11 may include the method according to variation 10 wherein the rotor wheel may be allowed to contact the thrust bearing when rotating and when experiencing a significant axial load.

Variation 12 may include the method according to variation 10 wherein the thrust bearing may have an outer periphery. A vent opening may be formed from the slot through the outer periphery of the thrust bearing.

Variation 13 may include a method according to any of variations 10 through 12 and may include increasing a dynamic pressure between the rotor wheel and the housing by positioning the thrust bearing in a position that projects from the housing toward the rotor wheel.

Variation 14 may include a method according to variation 12 or 13 and may include positioning the thrust bearing so that the rotor wheel directs flow to reduce a static pressure between the rotor wheel and the housing.

Variation 15 may include a turbocharger assembly for use with an internal combustion engine and may include a housing with a shaft rotatably supported by the housing. A rotor wheel may be connected to the shaft to rotate therewith. The rotor wheel may have a front with blades, a back wall facing the housing, and a tip at its outer circumference. A thrust bearing may be positioned between the rotor wheel and the housing, near the tip.

Variation 16 may include a turbocharger assembly according to variation 15 wherein the thrust bearing may include a slot that opens toward the rotor wheel. Allowing the working hydrodynamic section to deflect relative to the housing Variation 17 may include a turbocharger assembly according to variation 15 or 16 wherein the thrust bearing may be annular in shape and may include a diameter. The slot may extend around a majority of the diameter.

Variation 18 may include a turbocharger assembly according to variation 16 or 17 wherein the thrust bearing may include an outer periphery and wherein the slot may include a first end and a second end. The first end may open through the outer periphery, and the second end may be a blind end.

Variation 19 may include a turbocharger assembly according to any of variations 15 through 18 wherein the thrust bearing may protrude from the housing toward the rotor wheel.

Variation 20 may include a turbocharger assembly according to any of variations 15 through 19 wherein the rotor wheel may be a first rotor wheel, and the thrust bearing may be a first thrust bearing. The assembly may include a second rotor wheel and a second thrust bearing. The second thrust bearing may be positioned between the housing and the second rotor wheel.

The above description of select variations within the scope of the invention is merely illustrative in nature and, thus, variations or variants thereof are not to be regarded as a departure from the spirit and scope of the invention.

What is claimed is:

1. A product for use with a turbocharger system comprising:
    a housing;
    a rotor wheel rotatable relative to the housing, the rotor wheel having a front face with blades disposed in a gas stream and a back wall facing the housing, the rotor wheel generating thrust loads; and,
    a thrust bearing positioned on the housing and facing the back wall, the thrust bearing configured to directly absorb the thrust loads from the rotor wheel.

2. The product according to claim 1 wherein the thrust bearing is annular in shape and directly absorbs the thrust load through contact between the rotor wheel and the thrust bearing.

3. The product according to claim 2 wherein a slot is formed in the thrust bearing, the slot extending around a majority of the thrust bearing to allow at least a part of the thrust bearing to be compliant.

4. The product according to claim 3 wherein the thrust bearing has an inner periphery and an outer periphery and wherein a majority of the slot is nearer the inner periphery than the outer periphery.

5. The product according to claim 3 wherein the slot has a vent that opens through an outer periphery of the thrust bearing.

6. The product according to claim 1 wherein the thrust bearing extends toward the back wall and wherein a back wall cavity is defined between the rotor wheel and the housing, the thrust bearing located in the back wall cavity and fixed on the housing and wherein the housing has a section containing lubricant and wherein the thrust bearing directs a pressure in the back wall cavity to maintain the lubricant in the housing.

7. The product according to claim 1 wherein the thrust bearing is fixed on the housing by a compliant element that is compressible and allows at least part of the thrust bearing to move relative to the housing.

8. The product according to claim 1 wherein the thrust bearing extends along the housing from a first edge to a second edge and includes a ramp section extending from the first edge so that the thrust bearing has an increasing thickness away from the housing along the ramp section from the first edge and toward the second edge.

9. The product according to claim 1 wherein a back wall cavity is defined between the rotor wheel and the thrust bearing, and the thrust bearing provides a tunable dynamic pressure caused by the rotor wheel in the back wall cavity.

10. A method of thrust load absorption in a turbocharger assembly that has a rotor wheel with a back wall, and a housing, the rotor wheel having an outer diameter and an inner diameter, the method comprising:

providing a thrust bearing on the housing so that the thrust bearing faces the back wall, affecting a gas pressure between the back wall and the housing by the thrust bearing, reducing the gas pressure acting on the back wall toward the outer diameter and increasing the gas pressure acting on the back wall toward the inner diameter by changing a radial slope of the thrust bearing from the outer diameter to the inner diameter.

11. The method according to claim 10 further comprising allowing the rotor wheel to contact the thrust bearing when rotating and when experiencing a significant axial load.

12. The method according to claim 10 wherein the thrust bearing has an outer periphery and comprising forming a vent that opens from the slot through the outer periphery of the thrust bearing.

13. The method according to claim 12 further comprising the step of increasing a dynamic pressure between the rotor wheel and the housing by positioning the thrust bearing in a position that projects from the housing toward the rotor wheel.

14. The method according to claim 13 further comprising the step of positioning the thrust bearing so that the rotor wheel directs flow to reduce a static pressure between the rotor wheel and the housing.

15. A turbocharger assembly for use with an internal combustion engine comprising:

a housing;

a shaft rotatably supported by the housing and extending in an axial direction;

a rotor wheel connected to the shaft to rotate therewith, the rotor wheel has a front with blades and has a back wall facing the housing, and has a tip at an outer circumference, with a back wall cavity defined on one side by the back wall and on another side by the housing;

a thrust bearing positioned against the housing between the rotor wheel and the housing and in the back wall cavity, the thrust bearing positioned near the tip, wherein the back wall cavity is unobstructed in the axial direction between the back wall and the housing except for by the thrust bearing.

16. The turbocharger assembly according to claim 15 wherein the thrust bearing includes a slot that opens toward the rotor wheel, the slot configured to allow a working hydrodynamic section of the thrust bearing to deflect relative to the housing.

17. The turbocharger assembly according to claim 16 wherein the thrust bearing is annular in shape and includes a diameter, and wherein the slot extends around a majority of the diameter.

18. The turbocharger assembly according to claim 17 wherein the thrust bearing includes an outer periphery and wherein the slot includes a first end and a second end, and wherein the first end opens through the outer periphery, and wherein the second end is a blind end.

19. The turbocharger assembly according to claim 15 wherein the thrust bearing protrudes from the housing toward the rotor wheel.

20. The turbocharger assembly according to claim 15 wherein the rotor wheel is a first rotor wheel, and the thrust bearing is a first thrust bearing and further comprising a second rotor wheel and a second thrust bearing, wherein the second thrust bearing is positioned between the housing and the second rotor wheel.

21. A product for use with a turbocharger system comprising:

a housing;

a shaft rotating in the housing and extending in an axial direction;

a rotor wheel rotatable relative to the housing, the rotor wheel having a front face with blades disposed in a gas stream and a back wall facing the housing, with a back wall cavity defined on a first side by the rotor wheel and on a second side by the housing, and a thrust bearing positioned on the housing in the back wall cavity and being non-rotating, wherein the back wall cavity is unobstructed in the axial direction between the back wall and the housing except for by the thrust bearing.

22. The product according to claim 21 further comprising a second rotor wheel connected to the shaft wherein the product does not include a thrust transfer feature between the rotor wheels that rotates with the shaft.

23. The product according to claim 21 further comprising a second rotor wheel rotatable relative to the housing, the second rotor wheel having a second back wall facing the housing, with a second back wall cavity defined on a third side by the second rotor wheel and on a fourth side by the housing, and a second thrust bearing positioned on the housing in the second back wall cavity and being non-rotating, wherein the second back wall cavity is unobstructed in the axial direction between the second back wall and the housing except for by the second thrust bearing.

24. The product according to claim 21 wherein the rotor wheel contacts the thrust bearing to transfer thrust in the axial direction.

25. The product according to claim 21 wherein the thrust bearing extends along the housing from a first edge to a second edge and includes a ramp section extending from the first edge so that the thrust bearing has an increasing thickness in a direction away from the housing along the ramp section from the first edge and toward the second edge.

26. The product according to claim 25 wherein the thrust bearing includes a land between the ramp section and the second edge, wherein the land has a consistent thickness in the direction.

27. The product according to claim 21 wherein an annular groove is formed in the housing and the thrust bearing is fixed in the annular groove.

28. The product according to claim 21 wherein an unobstructed clearance space is defined between the rotor wheel and the thrust bearing.

29. The product according to claim 21 further comprising a compliant element positioned between, and contacting, each of the thrust bearing and the housing.

30. The product according to claim 21 wherein the slot is annular in shape and has a diameter, and wherein a slot is formed in the thrust bearing, the slot having a length that extends around a majority of the diameter, and the slot open toward the rotor wheel along its entire length.

* * * * *